United States Patent
Gaultier

(10) Patent No.: US 9,766,073 B2
(45) Date of Patent: Sep. 19, 2017

(54) METHOD FOR MANAGING AND REPRESENTING A RATE OF TURN INDICATOR FOR AN AIRCRAFT

(71) Applicant: THALES, Neuilly sur Seine (FR)

(72) Inventor: Philippe Gaultier, Saint Aubin de Medoc (FR)

(73) Assignee: Thales, Neuilly sur Seine (FR)

( * ) Notice: Subject to any disclaimer, the term of this patent is extended or adjusted under 35 U.S.C. 154(b) by 597 days.

(21) Appl. No.: 14/324,033

(22) Filed: Jul. 3, 2014

(65) Prior Publication Data

US 2016/0245654 A1    Aug. 25, 2016

(30) Foreign Application Priority Data

Jul. 5, 2013   (FR) ...................................... 13 01597

(51) Int. Cl.
| | | |
|---|---|---|
| *G01C 21/10* | (2006.01) | |
| *B64D 45/00* | (2006.01) | |
| *G01C 23/00* | (2006.01) | |

(52) U.S. Cl.
CPC ............. *G01C 21/10* (2013.01); *B64D 45/00* (2013.01); *G01C 23/005* (2013.01); *G09G 2380/12* (2013.01)

(58) Field of Classification Search
CPC ........ B64D 43/00; B64D 45/00; G01C 23/00; G01C 23/005
See application file for complete search history.

(56) References Cited

U.S. PATENT DOCUMENTS

| | | |
|---|---|---|
| 6,489,898 B1 | 12/2002 | Nicholls |
| 6,867,711 B1 | 3/2005 | Langner et al. |
| | (Continued) | |

FOREIGN PATENT DOCUMENTS

EP    0 456 329 A1    11/1991

OTHER PUBLICATIONS

Communication enclosing French Preliminary Search Report and Written Opinion on the Patentability of the Invention for corresponding French Patent Application No. 1301597, 7 pgs., mailed Apr. 4, 2014.

*Primary Examiner* — Thomas G Black
*Assistant Examiner* — Peter D Nolan
(74) *Attorney, Agent, or Firm* — Blakely, Sokoloff, Taylor & Zafman LLP

(57) ABSTRACT

The general field of the invention is that of methods for representing a rate of turn indicator for an aircraft implemented by an on-board avionics system. The method includes a step of graphically representing on a visualization device a symbol called "aeroplane model", said graphic representation being a function of the specific speed of the aircraft and of its angle of inclination. In a favored embodiment, said aeroplane model includes two straight arms interlinked by a common point and inclined to the horizontal symmetrically in such a way as to form an inverted V. The angle of inclination of the two arms of the V is proportional to the specific speed of the aircraft, the coefficient of proportionality being determined in such a way that when the specific speed and the angle of inclination correspond to values compatible with the standard rate, said arm is parallel to the horizon line, thus indicating that the aircraft is carrying out its turn at the standard rate.

6 Claims, 2 Drawing Sheets

(56) References Cited

U.S. PATENT DOCUMENTS

| | | | | |
|---|---|---|---|---|
| 6,931,368 B1* | 8/2005 | Seifert | ............ | G01C 23/005 |
| | | | | 434/43 |
| 8,462,020 B1* | 6/2013 | Vanhoozer | ............ | G01C 23/005 |
| | | | | 340/975 |
| 2005/0012642 A1* | 1/2005 | Sacle | ............ | G01C 23/005 |
| | | | | 340/973 |
| 2011/0193725 A1* | 8/2011 | Wise | ............ | G01C 23/005 |
| | | | | 340/974 |
| 2011/0205090 A1* | 8/2011 | Marstall | ............ | G01C 23/005 |
| | | | | 340/975 |
| 2013/0328702 A1* | 12/2013 | Vanhoozer | ............ | G01C 23/005 |
| | | | | 340/975 |

\* cited by examiner

METHOD FOR MANAGING AND REPRESENTING A RATE OF TURN INDICATOR FOR AN AIRCRAFT

BACKGROUND OF THE INVENTION

1. Field of the Invention

The field of the invention is that of the presentation of the information needed by an aircraft captain to carry out a turn in good conditions.

2. Description of the Prior Art

Under certain conditions, turns carried out on aircraft are performed at a predetermined angular speed known as standard rate of turn. This angular speed is expressed in degrees/minute. Thus, a standard rate of 180°/mn signifies that the aircraft carries out a half-turn in one minute. This standard rate is applied during the execution of certain manoeuvres, for example, in the context of flight procedures using the so-called "IFR" ("Instrument Flight Rules") instruments and particularly in the context of "IMC" ("Instrument Meteorological Conditions") procedures. Thus, when an aircraft is made to wait in a loop called the "holding pattern" and including two semi-circular parts and two straight parts, if the duration of the wait is for example of 5 minutes per holding pattern traveled, each semi-circular part is effected at the standard rate of 180°/mn in one minute and each rectilinear part is effected in one minute and thirty seconds.

For the manoeuvre to take place correctly at the standard rate, the aircraft must have an inclination also called angle of roll, variable as a function of the speed that is imposed on it by the category of the aircraft and the type of procedure. Moreover, if the aircraft has to climb or descend during the manoeuvre, it is also necessary to impress upon it a set angle of attitude.

Currently, these items of information are displayed in a dissociated manner on the control panels. On conventional electromechanical panel instruments, these items of information can be displayed on two different instruments. On electronic panel instruments of the "EFIS" ("Electronic Flight Information System") type, these items of information are represented in a graphic representation called "ADI" ("Attitude Director Indicator"), which gives captain the necessary information for the piloting of his craft.

One such simplified configuration is represented in FIG. 1. It includes an artificial horizon including a horizon line 10, a first scale 11 to the left of FIG. 1 representing the speed of the craft, a second scale 12 to the right representing its altitude, a central symbol 13 called "aeroplane model" representing the attitude of the craft and a rate of turn indicator 14 situated at the top of FIG. 1. During a turn, the attention of the captain is concentrated on the position of the aeroplane model on the ADI. Indeed, a change of inclination translates into modifications of the lift and drag of the aircraft which induce variations in incidence. He must also monitor the rate of turn of the craft. It will be understood that the monitoring of two separate indicators and correlating them can present a difficulty for the captain and reduce his reaction times.

SUMMARY OF THE INVENTION

The rate of turn indicator according to the invention does not present these drawbacks. It groups under a single symbol the various items of information needed to know the rate of turn and, above all, it allows the captain to determine very easily if the rate of turn of his craft is at the standard rate or not. More precisely, the subject of the invention is a method for managing and representing a rate of turn indicator for an aircraft implemented by an avionics system on board an aircraft, said avionics system including:

First measuring means making it possible to determine the angles of inclination in roll and in pitch of the aircraft;
Second means for measuring the specific speed of the aircraft;
Electronic computing means;
Display means including a visualization device arranged in such a way as to display at least one line called horizon line, the inclination of which represents the angle of inclination of the aircraft and a symbol called "aeroplane model", the position of which with respect to the horizon line represents the attitude of the aircraft;
Information storing means including at least a first predetermined value of a specific speed of the aircraft and a second predetermined value of an angle of inclination associated with the first value, these two values defining the standard rate of turn allowing the aircraft to carry out a turn during a predetermined time period;

characterized in that the method includes a step of computing and graphically representing the aeroplane model arranged in such a way that the graphic representation of the aeroplane model is a function of the specific speed of the aircraft and of its angle of inclination.

Advantageously, said aeroplane model includes at least two straight arms of equal length, interlinked by a common point and inclined to the horizontal symmetrically in such a way as to form an inverted V;

the angle of inclination of one of the two arms of the V is proportional to the specific speed of the aircraft, the coefficient of proportionality being determined in such a way that when the specific speed and the angle of roll correspond to the first value and to the second value of the standard rate, said arm is parallel to the horizon line, thus indicating that the aircraft is carrying out its turn at the standard rate.

Advantageously, the angle of inclination of the arms of the V being expressed in degrees, the speed being expressed in knots, the coefficient of proportionality has a value of substantially 0.15 degrees/knot.

Advantageously, the storage means including at least a third predetermined value defining the maximum authorized inclination, the avionics system including sonic alarm means, when said maximum inclination is reached, the method includes an alerting step during which the sonic alarm means are activated and the aeroplane model becomes red.

Advantageously, the general shape of the model is a symmetrical chevron including two upper bars and two lower bars, the two upper bars being the two arms of said model.

BRIEF DESCRIPTION OF THE DRAWINGS

The invention will be better understood and other advantages will become apparent upon reading the following, in no way limiting, description and thanks to the appended figures among which.

DETAILED DESCRIPTION

To be implemented, the method for graphically representing a rate of turn indicator for an aircraft according to the invention requires an on-board avionics system. Such systems exist today on all modern aircraft. They must at least include:

sensors of the attitude of the aircraft such as gyroscopes, accelerometers or an inertial platform;

electronic computers making it possible, among other things, to process data and perform graphic representation computations, according to said data;

display means including at least one visualization device arranged on the control panel of the aircraft which displays a graphic representation of ADI type including the symbols according to the invention. These display means are generally colour LCD matrix screens.

It is possible to envisage various graphic representations of the aeroplane model arranged in such a way that these graphic representations are a function of the specific speed of the aircraft and of its angle of inclination. However, the "chevron" representation is particularly advantageous because, on the one hand, its shape is close to an abstract depiction of an aircraft and, on the other hand, it is always possible to align one of the arms of the chevron when the aircraft is at the standard rate.

Figure 1:
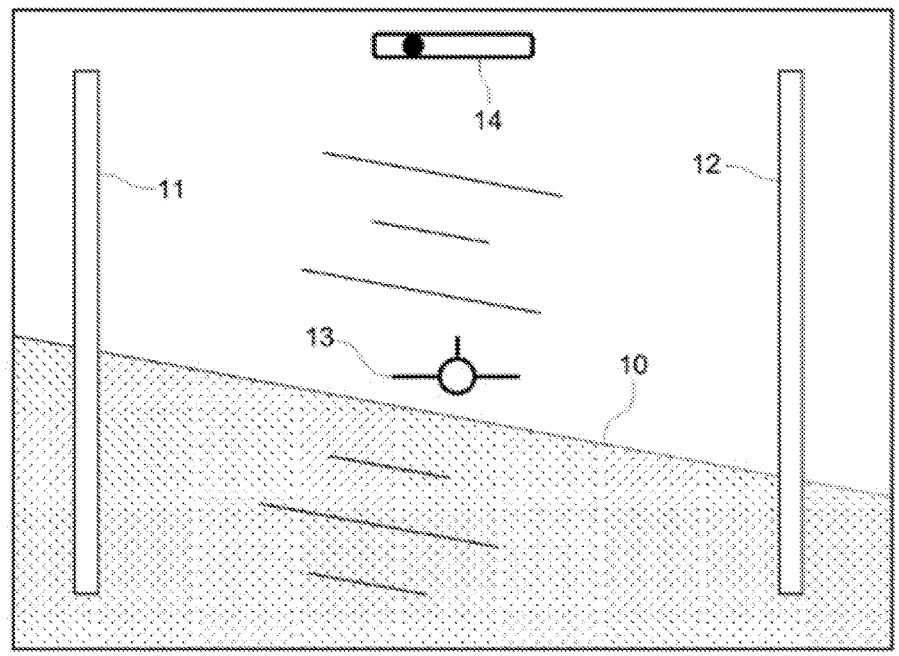
FIG. 1 already described represents a configuration of ADI type according to the prior art.
Figure 2:
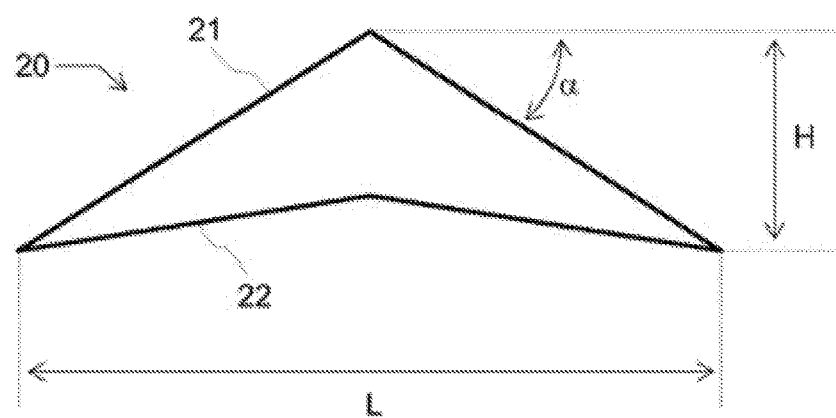
FIG. 2 represents the symbol of an aeroplane model according to the invention.

By way of non-limiting example, FIG. 2 represents an aeroplane model symbol 20 according to the invention in the shape of a chevron. The general shape of the model is a symmetrical chevron including two upper arms 21 and two lower arms 22. The two upper arms 21 are straight, of equal length, interlinked by a common point and inclined to the horizontal symmetrically in such a way as to form an inverted V. The chevron is generally of light colour if the attitude of the craft does not present any immediate danger. It should be noted that the inverted-V shape of the two upper arms is fundamental, whereas the lower arms can take other geometrical shapes.

The angle of inclination as an absolute value of the two arms of the V is proportional to the specific speed $V_P$ of the aircraft. The coefficient of proportionality K is such that, when the specific speed and the angle of roll correspond to the standard rate, one of the arms of the V is parallel to the horizon line of the ADI, thereby indicating that the aircraft is carrying out its turn at the standard rate.

If α denotes this angle of inclination, if H is the height of the chevron and L its width as indicated in FIG. 2, we have the relationships:

$$tg\alpha = 2H/L \text{ and}$$

$$\alpha = K \cdot V_P$$

For civil aviation applications, the angle of inclination of the arms of the V being expressed in degrees, the speed being expressed in knots, the coefficient of proportionality has a value of substantially 0.15 degrees/knot. The inclination is therefore 15 degrees for a specific speed of 100 knots and 20 degrees at a speed of 140 knots.

Figure 3:
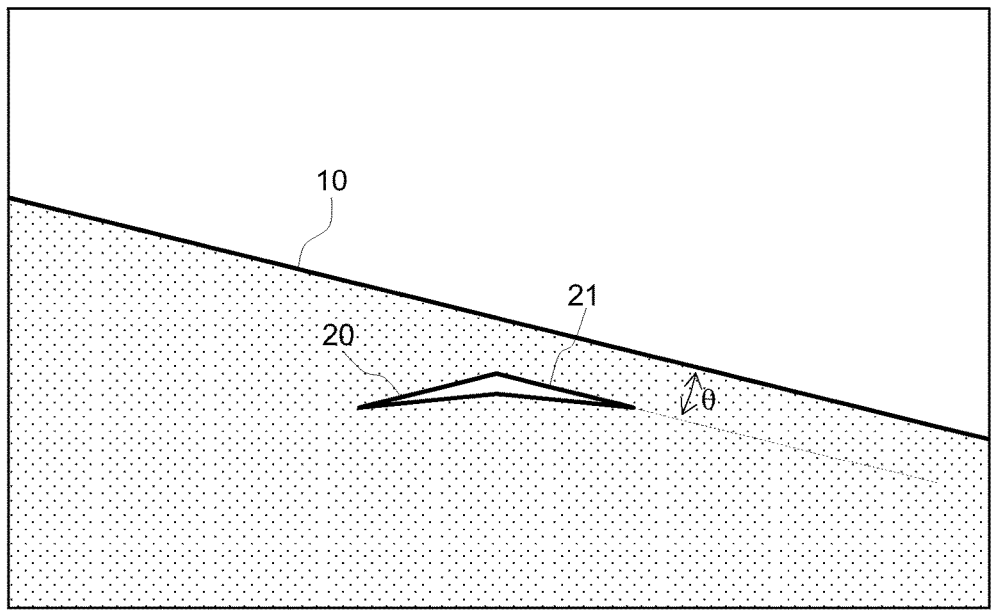
FIGS. 3 and 4 represent an ADI configuration including an aeroplane model according to the invention.
Figure 4:
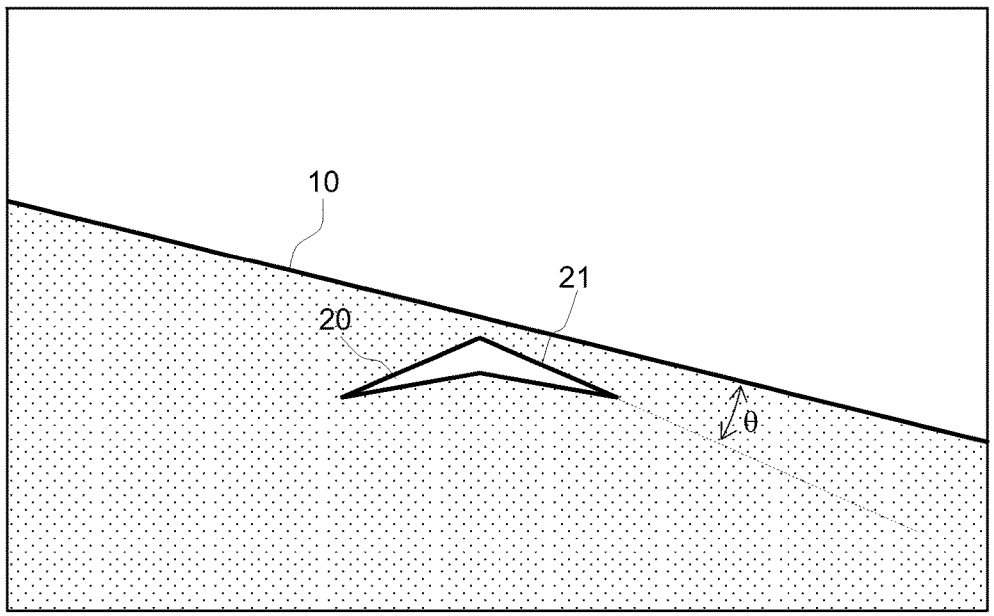

FIGS. 3 and 4 represent an ADI including such an aeroplane model. In these FIGS. 3 and 4, only the horizon line 10 and the aeroplane model 20 according to the invention are represented. In both cases, the aircraft is in the process of carrying out a turn and it is in descent, the model being under the horizon line.

In FIG. 3, the specific speed of the aircraft corresponds to that of the standard rate, the angle θ between the upper bar 20 of the chevron and the horizon line 10 is zero. In FIG. 4, the specific speed of the aircraft is above that of the standard rate, the angle θ between the upper bar 20 of the chevron and the horizon line 10 is no longer zero. In this case, the captain adjusts the inclination of his craft to return to the conditions of the standard rate of turn.

The representation of the aeroplane model as a chevron according to the invention has two essential advantages. The first is that, since the human eye is very sensitive to defects of parallelism, the captain realizes very quickly simply by viewing his ADI that the inclination of his craft corresponds or does not correspond to that of the standard rate. Moreover, when this inclination is not the right one, the value of the angle θ between the upper bar 20 of the chevron and the horizon line 10 gives him a precise indication of the manoeuvre to be carried out. Thus, in the case in FIG. 4, the captain must further "tighten" the turn in progress.

The representation of the model according to the invention can also be used for other purposes. Thus, if the craft reaches or exceeds the maximum authorized inclination, the avionics system includes sonic alarm means arranged in such a way that, when the maximum authorized inclination is reached, the method for managing and representing the model includes an alerting step during which the sonic alarm means are activated and the aeroplane model becomes red. If the exceeding is accidental, the captain then reduces the inclination of his craft back to a normal rate. If the exceeding is deliberate, he continues his manoeuvre until a new set-point appears.

This type of symbol system can also be used for automatic piloting. The captain then fulfils a mission of monitoring the way in which the turn of his craft is carried out, only intervening if need be.

What is claimed is:

1. A method for managing and representing a rate of turn indicator for an aircraft implemented by an avionics system on board an aircraft, the avionics system comprising:

a first sensor to determine the angles of inclination in roll and in pitch of the aircraft;

a second sensor to measure the specific speed of the aircraft;

an electronic computer;

a display comprising a visualization device arranged in such a way as to display at least one line called horizon line, the inclination of which represents the angle of inclination of the aircraft and an airplane model symbol, the position of which with respect to the horizon line represents the attitude of the aircraft;

a storage component comprising at least a first predetermined value of a specific speed of the aircraft and a second predetermined value of an angle of inclination associated with the first value, these two values defining the standard rate of turn allowing the aircraft to carry out a turn during a predetermined time period;

wherein an operation of computing and graphically representing the airplane model symbol is arranged in such a way that the graphic representation of the airplane model symbol is a function of the specific speed of the aircraft and of the angle of inclination, wherein the airplane model symbol comprises at least two straight arms of equal length, interlinked by a common point and inclined to the horizontal symmetrically in such a way as to form an inverted V; and wherein the angle of inclination of one of the two arms of the V is proportional to the specific speed of the aircraft, the coefficient of proportionality being determined in such a way that when the specific speed and the angle of roll correspond to the first value and to the second value of the standard rate, the arm is parallel to the horizon line, thus indicating that the aircraft is carrying out its turn at the standard rate.

2. A method according to claim 1, wherein, the angle of inclination of the arms of the V being expressed in degrees, the speed being expressed in knots, the coefficient of proportionality has a value of substantially 0.15 degrees/knot.

3. A method according to claim 2, wherein the general shape of the model is a symmetrical chevron including two upper bars and two lower bars, the two upper bars being the two arms of the model.

4. A method according to claim 1, wherein the storage component comprises at least a third predetermined value defining a maximum authorized inclination, and the avionics system further comprises a sonic alarm that, when the maximum inclination is reached, an alerting operation is triggered during which the sonic alarm is activated and the airplane model symbol becomes red.

5. A method according to claim 4, wherein the general shape of the model is a symmetrical chevron including two upper bars and two lower bars, the two upper bars being the two arms of the model.

6. A method according to claim 1, wherein the general shape of the model is a symmetrical chevron including two upper bars and two lower bars, the two upper bars being the two arms of the model.

* * * * *